United States Patent
Kerns

[19]

[11] Patent Number: 5,956,330
[45] Date of Patent: Sep. 21, 1999

[54] BANDWIDTH MANAGEMENT IN A HETEROGENOUS WIRELESS PERSONAL COMMUNICATIONS SYSTEM

[75] Inventor: Robert Q. Kerns, Burlingame, Calif.

[73] Assignee: ReSound Corporation, Redwood City, Calif.

[21] Appl. No.: 08/829,055

[22] Filed: Mar. 31, 1997

[51] Int. Cl.⁶ .................................................. H04J 3/00
[52] U.S. Cl. ........................... 370/336; 370/350; 370/468
[58] Field of Search ..................................... 370/321, 326, 370/328, 329, 330, 336, 337, 347, 349, 350, 345, 468, 503, 509, 512, 518; 455/67.3; 381/328

[56] References Cited

U.S. PATENT DOCUMENTS

| | | | |
|---|---|---|---|
| 4,366,349 | 12/1982 | Adelman | 381/316 |
| 4,419,544 | 12/1983 | Adelman | 381/94.3 |
| 4,637,402 | 1/1987 | Adelman | 128/925 |
| 5,040,174 | 8/1991 | Takeuchi et al. | 370/368 |
| 5,148,548 | 9/1992 | Meche et al. | 455/514 |
| 5,202,927 | 4/1993 | Tøpholm | 381/315 |
| 5,276,908 | 1/1994 | Koohgoli et al. | 455/454 |
| 5,309,430 | 5/1994 | Verhille et al. | 370/397 |
| 5,390,254 | 2/1995 | Adelman | 381/315 |
| 5,444,696 | 8/1995 | Petranovich | 370/337 |
| 5,479,522 | 12/1995 | Lindemann et al. | 381/23.1 |
| 5,594,949 | 1/1997 | Andersson et al. | 455/62 |
| 5,710,762 | 1/1998 | Petranovich | 370/280 |
| 5,721,783 | 2/1998 | Anderson | 381/328 |

FOREIGN PATENT DOCUMENTS

WO 96/41498  12/1996  WIPO .

*Primary Examiner*—Chi H. Pham
*Assistant Examiner*—Kwang B. Yao
*Attorney, Agent, or Firm*—Burns, Doane, Swecker & Mathis LLP

[57] ABSTRACT

Bandwidth management techniques are provided for use in heterogenous wireless personal communications systems, designed minimize or eliminate interference between different personal communications units. Such units may be of various types including, for example, hearing health care units, telecommunications headsets and multimedia headsets. A bandwidth resource is shared among multiple autonomous communications systems in which a Remote Processing Unit and headset pair are coupled by a slotted wireless communications link. One of a pair of devices transmits real-time information to the other device of the pair. When difficulty is experienced receiving the real-time information because of interference from a different device pair, any of several different measures may be applied including physical adjustments such as (in an RF system) diversity and/or power control. If these adjustments are insufficient, a jump procedure may be performed in which the pair of devices jump to a different portion of the bandwidth resource determined to be free. A first negotiation procedure may be performed in which the Remote Processing Unit aligns its timebase to that of a selected other Remote Processing Unit; or a second negotiation procedure may be performed in which the Remote Processing Unit and the headset agree to cease exchanging audio information within one or more particular timeslots.

17 Claims, 16 Drawing Sheets

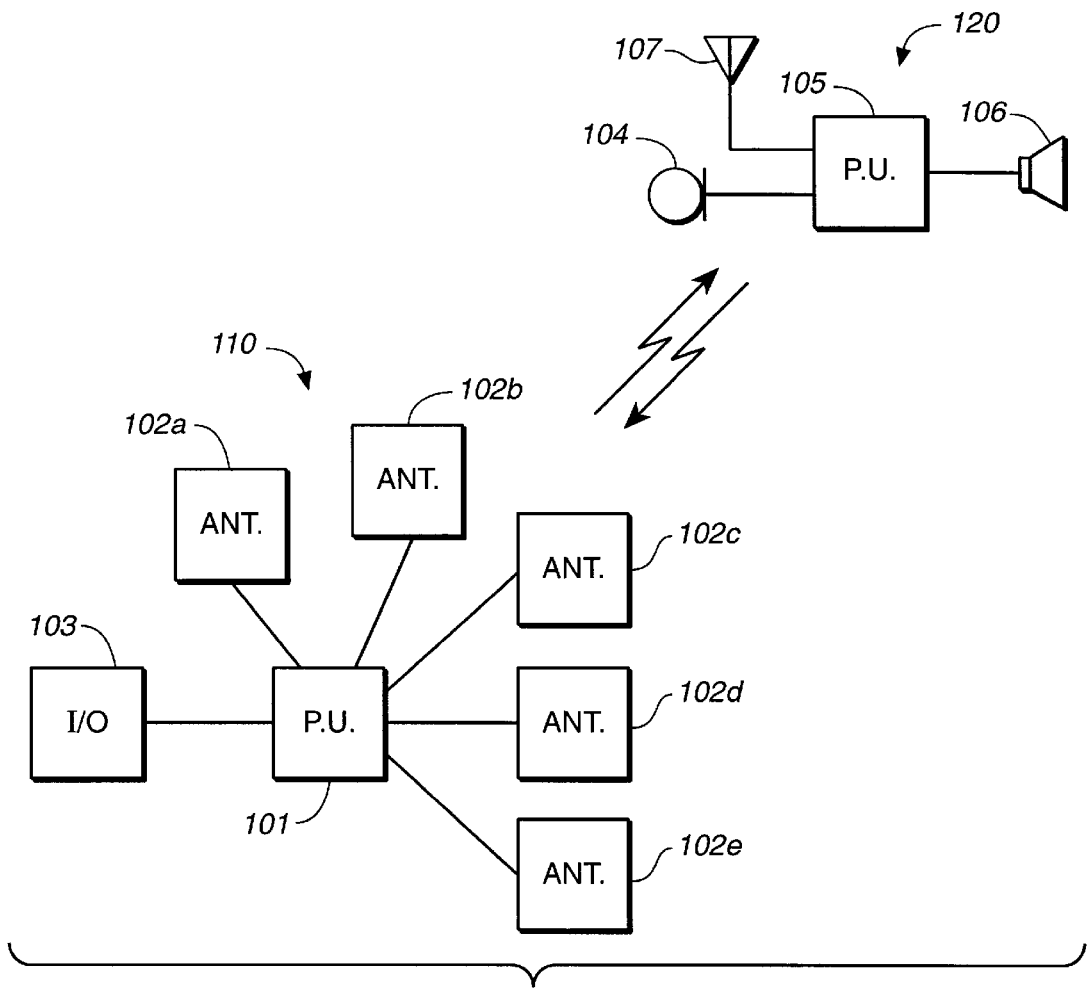
FIG._1
INTERFACE REGISTERS
(DIRECTLY ADDRESSABLE BY MICRO-CONTROLLER)
|  | BYTE |
|---|---|
| COMMAND / STATUS 0 |  |
| ADDRESS (LOW BYTE) |  |
| ADDRESS (HIGH BYTE) |  |
| DATA TRANSFER |  |
FIG._3A

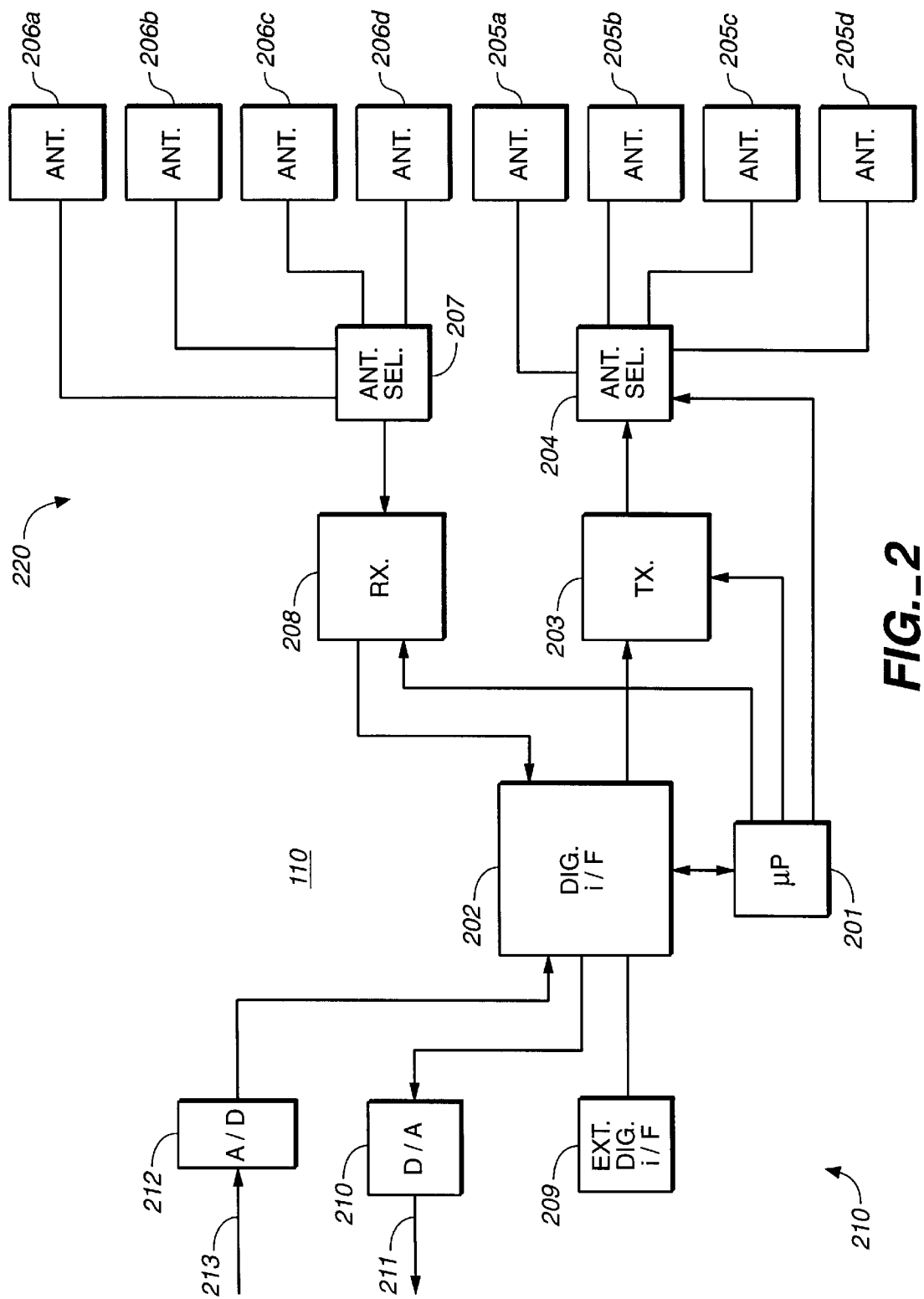
FIG._2

PRIMARY STATUS REGISTERS
(ADDRESS RANGE 0000-000F)

|  | HIGH BYTE | LOW BYTE |
|---|---|---|
| PHASE POSITION |  |  |
| SYNC COUNT / STATUS |  |  |
| HEADER COUNT / STATUS |  |  |
| HEADER ECC COUNT /STATUS |  |  |
| DATA COUNT / STATUS |  |  |
| DATA ECC COUNT / STATUS |  |  |
| INTERNAL COMMAND / STATUS A |  |  |
| INTERNAL COMMAND / STATUS B |  |  |

FIG._3B

PHASE POSITION REGISTERS
(ADDRESS RANGE 0100-011F)
(1 16 BIT REGISTER PER TIME SLOT)

|  | HIGH BYTE | LOW BYTE |
|---|---|---|
| TIME SLOT 0 |  |  |
| TIME SLOT 1 |  |  |
| TIME SLOT 2 |  |  |
| TIME SLOT 3 |  |  |
| TIME SLOT 4 |  |  |
| TIME SLOT 5 |  |  |
| TIME SLOT 6 |  |  |
| TIME SLOT 7 |  |  |
| TIME SLOT 8 |  |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

FIG._3D

DATA TRANSFER REGISTERS

| | LOW BYTE | HIGH BYTE | LOW ECC | HIGH ECC |
|---|---|---|---|---|
| HEADER | | | | |
| DATA BYTE 0 | | | | |
| DATA BYTE 1 | | | | |
| DATA BYTE 2 | | | | |
| DATA BYTE 3 | | | | |
| DATA BYTE 4 | | | | |
| DATA BYTE 5 | | | | |
| DATA BYTE 6 | | | | |
| DATA BYTE 7 | | | | |
| DATA BYTE 8 | | | | |
| DATA BYTE 9 | | | | |
| DATA BYTE 10 | | | | |
| DATA BYTE 11 | | | | |
| DATA BYTE 12 | | | | |
| DATA BYTE 13 | | | | |
| DATA BYTE 14 | | | | |
| DATA BYTE 15 | | | | |
| DATA BYTE 16 | | | | |
| DATA BYTE 17 | | | | |
| DATA BYTE 18 | | | | |
| DATA BYTE 19 | | | | |
| DATA BYTE 20 | | | | |
| DATA BYTE 21 | | | | |
| DATA BYTE 22 | | | | |
| DATA BYTE 23 | | | | |
| DATA BYTE 24 | | | | |
| DATA BYTE 25 | | | | |
| DATA BYTE 26 | | | | |
| DATA BYTE 27 | | | | |
| DATA BYTE 28 | | | | |
| DATA BYTE 29 | | | | |
| DATA BYTE 30 | | | | |
| DATA BYTE 31 | | | | |

FIG._3C

SYNC STATUS REGISTERS
(ADDRESS RANGE 0120-013F)
(2 8 BIT REGISTERS PER TIME SLOT)

|  | SYNC COUNT | LAST 8 FRAME STATUS |
|---|---|---|
| TIME SLOT 0 | COUNT OF GOOD SYNC | (1 BIT PER FRAME) |
| TIME SLOT 1 | FRAMES, ADD 1 TO COUNT | (BIT 7 IS OLDEST FRAME) |
| TIME SLOT 2 | FOR EACH GOOD SYNC |  |
| TIME SLOT 3 | PULSE, SUBTRACT 1 FROM |  |
| TIME SLOT 4 | COUNT FOR EACH BAD OR |  |
| TIME SLOT 5 | MISSING SYNC PULSE. |  |
| TIME SLOT 6 | A COUNT OF 0 INDICATES |  |
| TIME SLOT 7 | TOTAL LOSS OF SYNC. |  |
| TIME SLOT 8 |  |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

*FIG._3E*

HEADER STATUS REGISTERS
(ADDRESS RANGE 0140-015F)
(2 8 BIT REGISTERS PER TIME SLOT)

|  | DATA COUNT | LAST 8 FRAME STATUS |
|---|---|---|
| TIME SLOT 0 | COUNT OF GOOD SYNC | (1 BIT PER FRAME) |
| TIME SLOT 1 | FRAMES, ADD 1 TO COUNT | (BIT 7 IS OLDEST FRAME) |
| TIME SLOT 2 | FOR EACH GOOD DATA |  |
| TIME SLOT 3 | PACKET, SUBTRACT 1 FROM |  |
| TIME SLOT 4 | COUNT FOR EACH BAD OR |  |
| TIME SLOT 5 | MISSING DATA PACKET. |  |
| TIME SLOT 6 | A COUNT OF 0 INDICATES |  |
| TIME SLOT 7 | TOTAL LOSS OF DATA. |  |
| TIME SLOT 8 |  |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

*FIG._3F*

HEADER ECC STATUS REGISTERS
(ADDRESS RANGE 0160-017F)
(2 8 BIT REGISTERS PER TIME SLOT)

|  | DATA COUNT | LAST 8 FRAME STATUS |
|---|---|---|
| TIME SLOT 0 | COUNT OF GOOD ECC | (1 BIT PER FRAME) |
| TIME SLOT 1 | FRAMES, ADD 1 TO COUNT | (BIT 7 IS OLDEST FRAME) |
| TIME SLOT 2 | FOR EACH PERFECT DATA |  |
| TIME SLOT 3 | PACKET, SUBTRACT 1 FROM |  |
| TIME SLOT 4 | COUNT FOR EACH |  |
| TIME SLOT 5 | CORRECTED DATA PACKET. |  |
| TIME SLOT 6 | A COUNT OF 0 INDICATES |  |
| TIME SLOT 7 | VERY NOISY DATA WITH |  |
| TIME SLOT 8 | CONSTANT ECC ACTIVITY. |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

FIG._3G

DATA STATUS REGISTERS
(ADDRESS RANGE 0180-019F)
(2 8 BIT REGISTERS PER TIME SLOT)

|  | DATA COUNT | LAST 8 FRAME STATUS |
|---|---|---|
| TIME SLOT 0 | COUNT OF GOOD SYNC | (1 BIT PER FRAME) |
| TIME SLOT 1 | FRAMES, ADD 1 TO COUNT | (BIT 7 IS OLDEST FRAME) |
| TIME SLOT 2 | FOR EACH GOOD DATA |  |
| TIME SLOT 3 | PACKET, SUBTRACT 1 FROM |  |
| TIME SLOT 4 | COUNT FOR EACH BAD OR |  |
| TIME SLOT 5 | MISSING DATA PACKET. |  |
| TIME SLOT 6 | A COUNT OF 0 INDICATES |  |
| TIME SLOT 7 | TOTAL LOSS OF DATA. |  |
| TIME SLOT 8 |  |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

FIG._3H

ECC STATUS REGISTERS
(ADDRESS RANGE 01A0-01BF)
(2 8 BIT REGISTERS PER TIME SLOT)

|  | DATA COUNT | LAST 8 FRAME STATUS |
| --- | --- | --- |
| TIME SLOT 0 | COUNT OF GOOD ECC | (1 BIT PER FRAME) |
| TIME SLOT 1 | FRAMES, ADD 1 TO COUNT | (BIT 7 IS OLDEST FRAME) |
| TIME SLOT 2 | FOR EACH PERFECT DATA |  |
| TIME SLOT 3 | PACKET, SUBTRACT 1 FROM |  |
| TIME SLOT 4 | COUNT FOR EACH |  |
| TIME SLOT 5 | CORRECTED DATA PACKET. |  |
| TIME SLOT 6 | A COUNT OF 0 INDICATES |  |
| TIME SLOT 7 | VERY NOISY DATA WITH |  |
| TIME SLOT 8 | CONSTANT ECC ACTIVITY. |  |
| TIME SLOT 9 |  |  |
| TIME SLOT 10 |  |  |
| TIME SLOT 11 |  |  |
| TIME SLOT 12 |  |  |
| TIME SLOT 13 |  |  |
| TIME SLOT 14 |  |  |
| TIME SLOT 15 |  |  |

*FIG._3I*

SERIAL NUMBER REGISTER
(VISION COUNT ADDRESS RANGE 0200-020F)
(SERIAL NUMBER REGISTER RANGE 0210-024F)
(SERIAL NUMBERS OF RPU'S WHICH WE SEE)

— 301J

| | BYTE 0 | BYTE 1 | BYTE 2 | BYTE 3 | COUNT |
|---|---|---|---|---|---|
| TIME SLOT 0 | | | | | |
| TIME SLOT 1 | | | | | |
| TIME SLOT 2 | | | | | |
| TIME SLOT 3 | | | | | |
| TIME SLOT 4 | | | | | |
| TIME SLOT 5 | | | | | |
| TIME SLOT 6 | | | | | |
| TIME SLOT 7 | | | | | |
| TIME SLOT 8 | | | | | |
| TIME SLOT 9 | | | | | |
| TIME SLOT 10 | | | | | |
| TIME SLOT 11 | | | | | |
| TIME SLOT 12 | | | | | |
| TIME SLOT 13 | | | | | |
| TIME SLOT 14 | | | | | |
| TIME SLOT 15 | | | | | |

*FIG._3J*

CONTROL AND STATUS REGISTERS

|  | BIT 7 | BIT 6 | BIT 5 | BIT 4 | BIT 3 | BIT 2 | BIT 1 | BIT 0 |
|---|---|---|---|---|---|---|---|---|
| STATUS / CTL |  |  |  |  |  |  |  |  |
| STATUS / CTL B |  |  |  |  |  |  |  |  |
| UPLINK |  |  |  |  |  |  |  |  |
| DOWNLINK |  |  |  |  |  |  |  |  |
| EAR SERIAL 1 |  |  |  |  |  |  |  |  |
| EAR SERIAL 2 |  |  |  |  |  |  |  |  |
| EAR SERIAL 3 |  |  |  |  |  |  |  |  |
| EAR SERIAL 4 |  |  |  |  |  |  |  |  |
| EAR SERIAL 5 |  |  |  |  |  |  |  |  |
| EAR SERIAL 6 |  |  |  |  |  |  |  |  |
| EAR SERIAL 7 |  |  |  |  |  |  |  |  |
| EAR SERIAL 8 |  |  |  |  |  |  |  |  |
| RPU SERIAL 1 |  |  |  |  |  |  |  |  |
| RPU SERIAL 2 |  |  |  |  |  |  |  |  |
| RPU SERIAL 3 |  |  |  |  |  |  |  |  |
| RPU SERIAL 4 |  |  |  |  |  |  |  |  |
| RPU SERIAL 5 |  |  |  |  |  |  |  |  |
| RPU SERIAL 6 |  |  |  |  |  |  |  |  |
| RPU SERIAL 7 |  |  |  |  |  |  |  |  |
| RPU SERIAL 8 |  |  |  |  |  |  |  |  |
| EAR B SERIAL 1 |  |  |  |  |  |  |  |  |
| EAR B SERIAL 2 |  |  |  |  |  |  |  |  |
| EAR B SERIAL 3 |  |  |  |  |  |  |  |  |
| EAR B SERIAL 4 |  |  |  |  |  |  |  |  |
| EAR B SERIAL 5 |  |  |  |  |  |  |  |  |
| EAR B SERIAL 6 |  |  |  |  |  |  |  |  |
| EAR B SERIAL 7 |  |  |  |  |  |  |  |  |
| EAR B SERIAL 8 |  |  |  |  |  |  |  |  |

FIG._3K

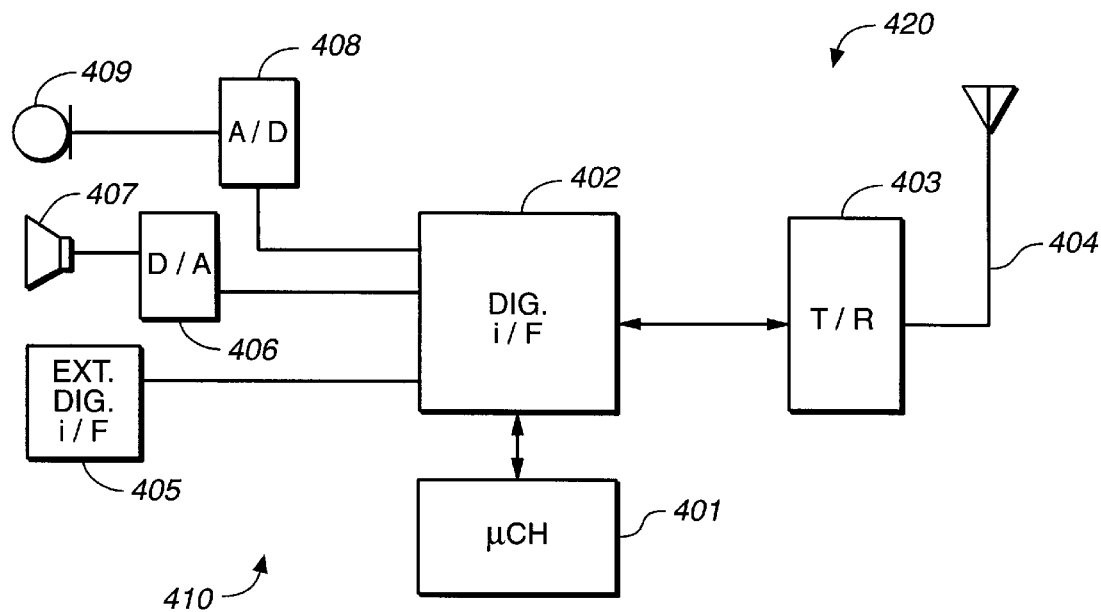
FIG._4
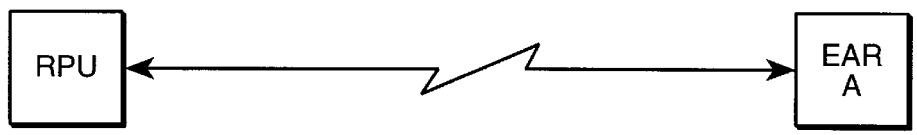
FIG._5   NO INTERFERENCE
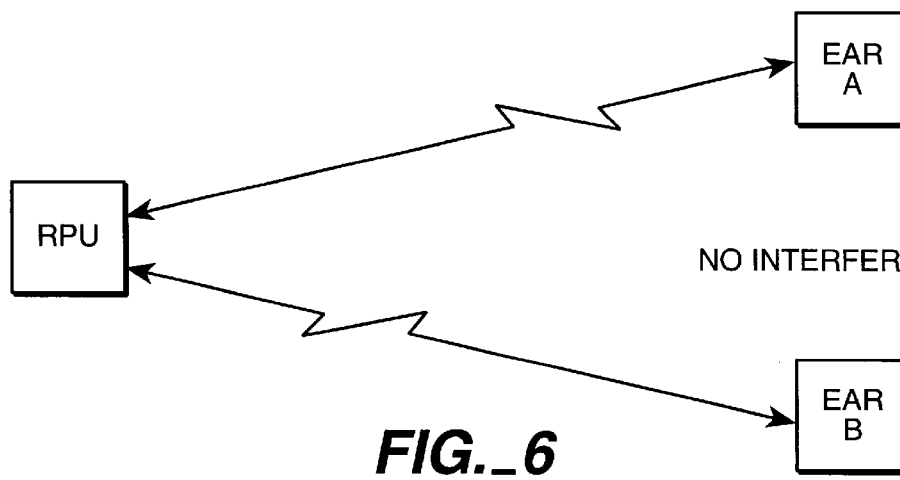
FIG._6   NO INTERFERENCE

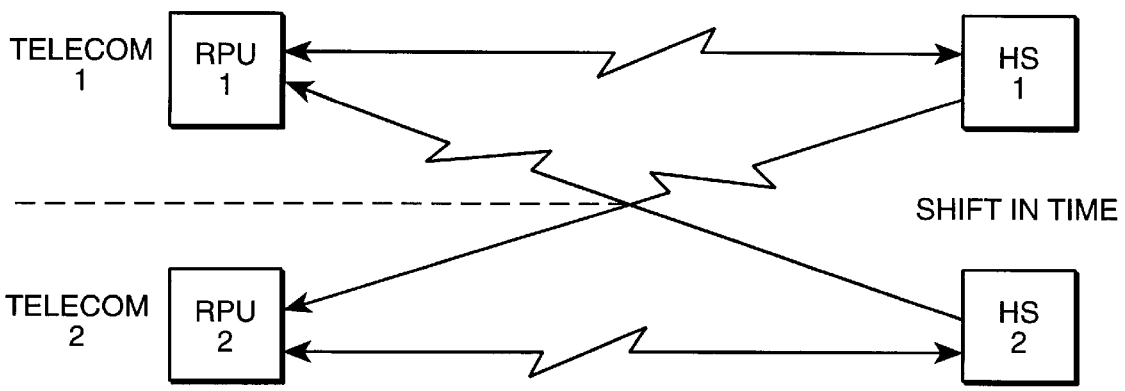
FIG._7
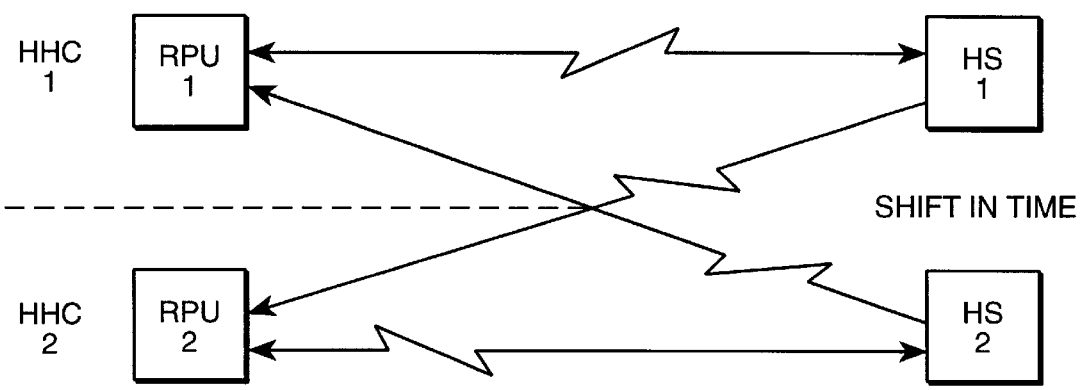
FIG._8
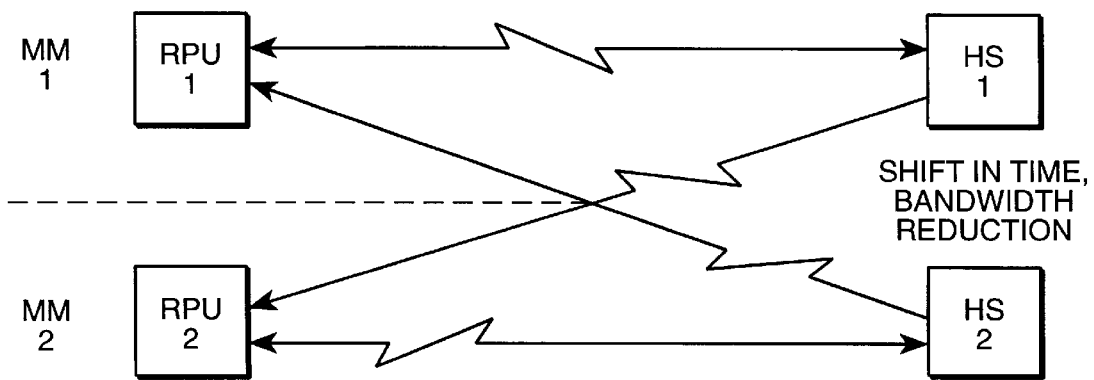
FIG._9

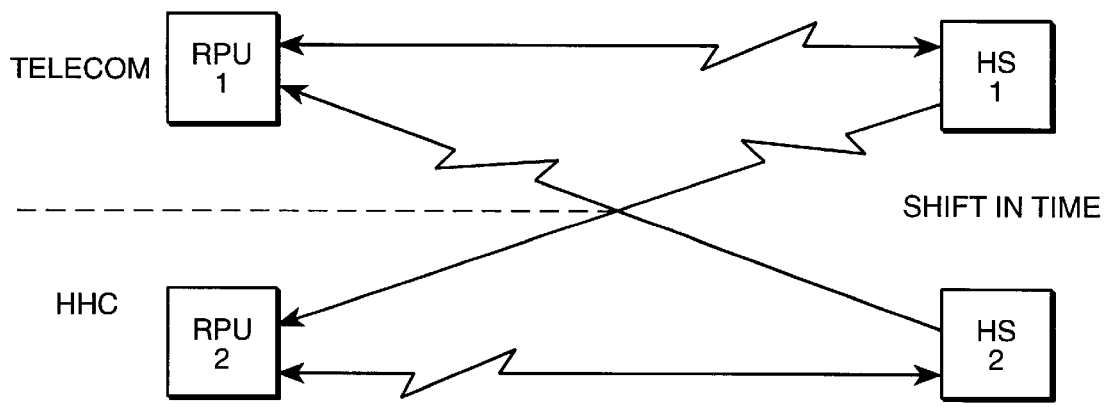
FIG._10
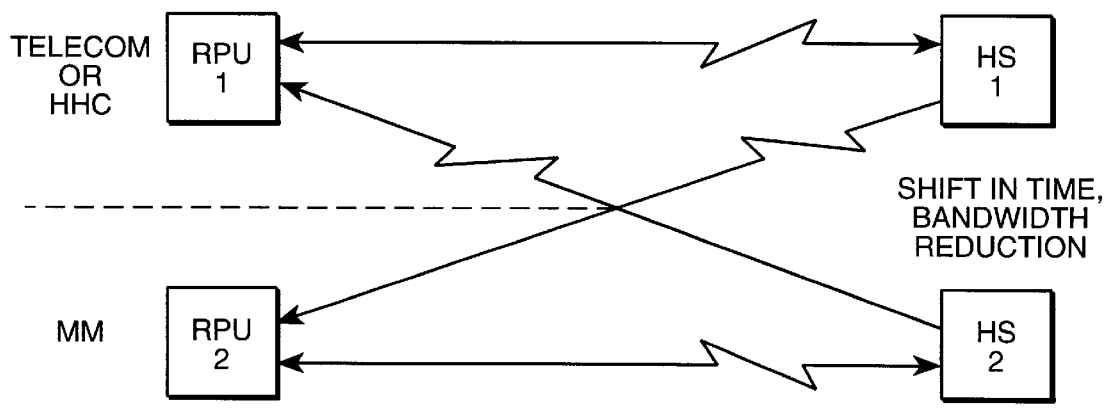
FIG._11

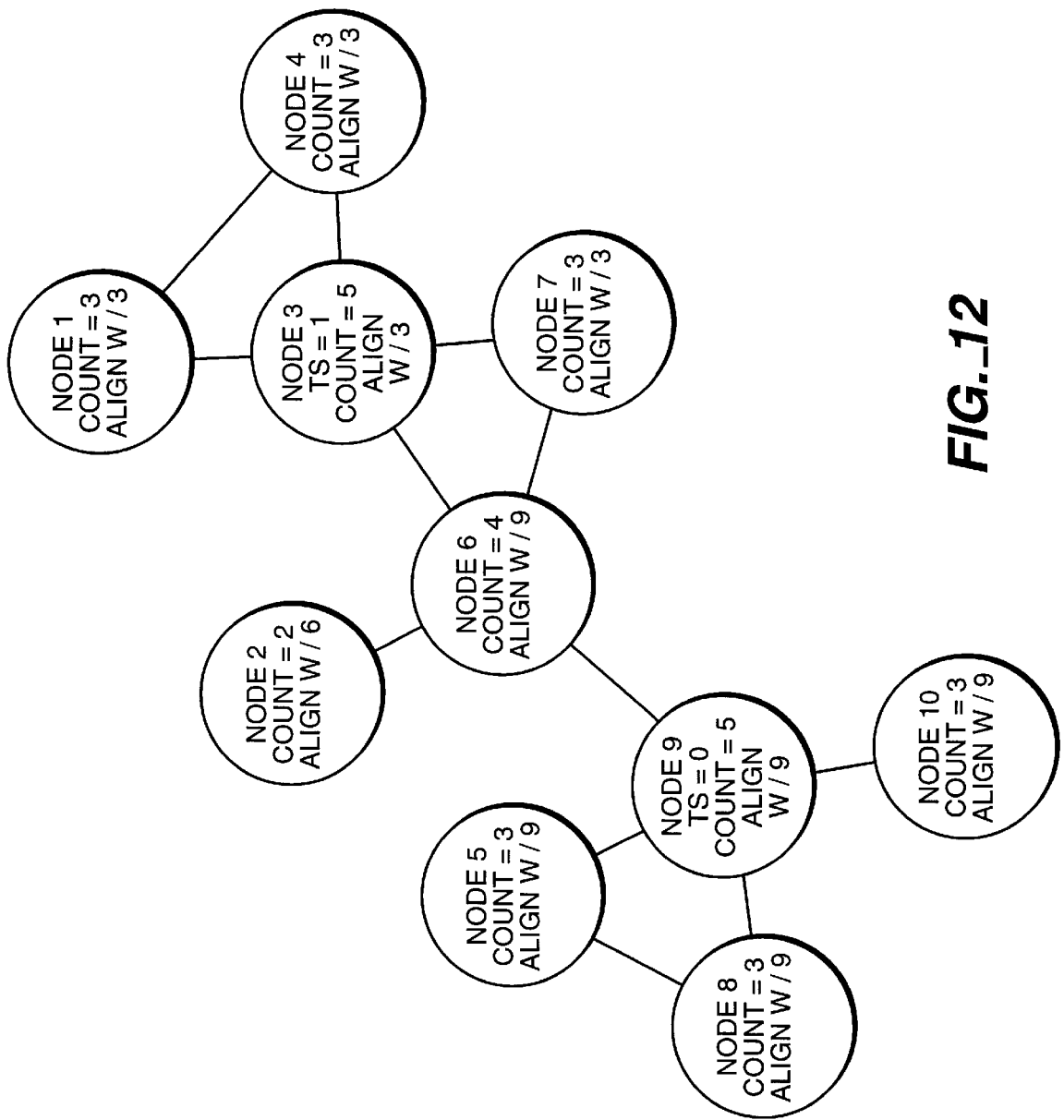
FIG._12

HEADER
(BIT ASSIGNMENTS)

| | FUNCTION |
|---|---|
| BIT 0 | PACKET TYPE (LOW ORDER BIT) |
| BIT 1 | PACKET TYPE |
| BIT 2 | PACKET TYPE |
| BIT 3 | PACKET TYPE (HIGH ORDER BIT) |
| BIT 4 | PACKET DEPENDENT INFORMATION (LOW ORDER BIT) |
| BIT 5 | PACKET DEPENDENT INFORMATION |
| BIT 6 | PACKET DEPENDENT INFORMATION |
| BIT 7 | PACKET DEPENDENT INFORMATION (HIGH ORDER BIT) |

*FIG._13A*

PACKET TYPE DEFINITION
(PACKET TYPE VALUE ASSIGNMENTS)

| FUNCTION | VALUE |
|---|---|
| IDLE PACKET | 0 |
| CONTROL PARAMETERS PACKET | 1 |
| STATUS REQUEST / REPLY PACKET | 2 |
| SERIAL NUMBER PACKET | 3 |
| SLOT NEGOTIATION PACKET | 4 |
| BANDWIDTH NEGOTIATION PACKET | 5 |
| SYNC LOSS PACKET | 6 |
| DATA TRANSFER PACKET | 7 |
| TBD | 8 |
| TBD | 9 |
| TBD | A |
| TBD | B |
| TBD | C |
| TBD | D |
| TBD | E |
| TBD | F |

*FIG._13B*

BANDWIDTH MANAGEMENT IN A HETEROGENOUS WIRELESS PERSONAL COMMUNICATIONS SYSTEM

BACKGROUND OF THE INVENTION

1. Field of the Invention

The present invention relates to wireless personal communications systems, particularly RF nanocell personal communications systems.

2. State of the Art

Wireless personal communications systems are known as exemplified by published International Application WO 96-41498 entitled Hearing Aid With Wireless Remote Processor, incorporated herein by reference. As described therein, a hearing aid system consists of an earpiece that can be hidden in the ear canal, and which communicates wirelessly with a remote processor unit (RPU). The RPU may be a belt pack, wallet or purse-based unit. Sounds from the environment are picked up by a microphone in the earpiece and sent with other information over a primary two-way wireless link to the RPU, where the audio signals are enhanced according to the user's needs. Signal processing is performed in the RPU rather than the earpiece to take advantage of relaxed size and power constraints. The enhanced audio signals may be combined with other information and transmitted from the RPU over the primary wireless link to the earpiece, where they are converted by a speaker to sounds that can only be heard by the user.

In an exemplary embodiment, communications between the RPU and the earpiece follow an interrogate/reply cycle. The reply portion of the primary wireless link (from the earpiece to the RPU) may use a reflective backscatter technique in which the RPU radiates a carrier signal and the earpiece uses a switch to change between a high backscatter antenna state and a low backscatter antenna state. An additional, optional secondary two-way wireless link can be used for communication between the RPU and a cellular telephone system or other source of information. Furthermore, an RPU keyboard, or voice recognition capabilities in the RPU, can be used to control hearing aid parameters and telephone dialing functions. Two earpieces and an RPU can be used in a binaural wireless system that provides hearing protection and noise cancellation simultaneous with hearing aid functions.

Although the system of WO 96-41498 arises out of the field of hearing health care, as may be appreciated from the foregoing description, the system is more broadly applicable to personal communications in general. Recently, attention has been drawn to the application of wireless personal communications systems to telecommunications and computing. At "ACM97: The Next 50 Years of Computing", for example, the prediction was made that in the future, personal computers will be wrist-sized, accompanied by a pair of reading glasses that present high-resolution images at a comfortable distance. A small, fitted earpiece and a "finger mouse" will be linked to other devices with low-power radio signals. Such a future is not far off.

One of the challenges presented in personal communications systems is to allow multiple such systems to function in close proximity to one another with no performance degradation (or graceful degradation) due to interference. An unofficial benchmark developed by the present assignee to test for robustness of communications in the presence of interference has been the "ten-person hug." That is, ten persons each with a personal communications system of the type described should be able to form a group hug without experiencing significant performance degradation of their respective personal communications systems.

Techniques for avoiding interference in personal communications systems of the foregoing type are described in WO 96-41498, FIG. 6 and accompanying description. Time division multiplexing techniques are used to share bandwidth among different systems. Multiple timeslots (e.g., ten or more) are defined, each timeslot accommodating a single interrogate/reply cycle. Each RPU contains a circuit know as a "sniffer", operational only when the RPU interrogator is not transmitting, that detects the presence of other interrogators. Before an RPU initiates an interrogate/reply cycle, it performs a clear channel assessment procedure in which it listens for other communications. This allows the RPU to determine whether or not other interrogators are nearby, as well as the time intervals during which nearby interrogators are transmitting. A timeslot selection procedure then follows. If no slots are occupied, the RPU is free to initiate an interrogate/reply cycle in any timeslot. If one or more timeslots are occupied but not all, the RPU randomly chooses a timeslot following an occupied timeslot in which to initiate an interrogate/reply cycle. If all timeslots are occupied, the RPU randomly selects a timeslot, repeated times if necessary, and attempts interrogation until interrogation is successful.

The timeslot selection procedure may or may not force other interrogators to change their timeslot selections due to interference, depending on relative geometry considerations. As users move around, their personal communications systems automatically adapt by continually finding new acceptable steady-state solutions using the foregoing time division multiplexing technique.

The foregoing mechanism described in WO 9641498 is relied upon exclusively for avoiding interference of multiple communications devices. This type of "jumping", however, is best described as a "free-for-all," each device jumping to satisfy its own communications needs without regard to other communications devices.

Although the foregoing interference avoidance technique is somewhat successful, it results in rapid degradation as the number of communications devices increases. It is not adequate to assure, to the greatest degree possible, interference-free operation of multiple personal communications systems in close proximity, especially where those personal communications systems may be of diverse types. Various types of personal communications systems are expected to include, among others, hearing health care units, telecommunications headsets, and multimedia headsets.

What is needed, then, is bandwidth management techniques for use in heterogenous wireless personal communications systems that assure, to the greatest degree possible, interference-free operation of multiple, possibly diverse, personal communications systems in close proximity. The present invention addresses this need.

SUMMARY OF THE INVENTION

The present invention, generally speaking, provides bandwidth management techniques for use in heterogenous wireless personal communications systems, designed minimize or eliminate interference between different personal communications units. Such units may be of various types including, for example, hearing health care units, telecommunications headsets and multimedia headsets. In one embodiment of the invention, a bandwidth resource is shared among multiple autonomous communications systems in which a Remote Processing Unit and headset pair are coupled by a slotted wireless communications link. One of a pair of devices transmits real-time information to the other device of the pair. When difficulty is experienced receiving the real-time information because of interference from a different device pair, any of several different measures may be applied including physical adjustments such as (in an RF system) diversity and/or power control. If these adjustments are insufficient, a jump procedure may be performed in which the pair of devices jump to a different portion of the bandwidth resource determined to be free. A first negotiation procedure may be performed in which the Remote Processing Unit aligns its timebase to that of a selected other Remote Processing Unit; or a second negotiation procedure may be performed in which the Remote Processing Unit and the headset agree to cease exchanging audio information within one or more particular portions of the shared bandwidth resource.

BRIEF DESCRIPTION OF THE DRAWING

The present invention may be further understood from the following description in conjunction with the appended drawing. In the drawing:

FIG. 1 is block diagram of a personal communications system in which the present invention may be used;

FIG. 2 is a block diagram showing in greater detail the RPU of FIG. 1;

FIG. 3A through FIG. 3K illustrate various registers of the RPU of FIG. 2;

FIG. 4 is a block diagram showing in greater detail the headset of FIG. 1;

FIG. 5 through FIG. 11 illustrate various communications scenarios to which the bandwidth management techniques of the present invention may be applied;

FIG. 12 is a graph used to illustrate the effect of a synchronization policy applied by the present bandwidth management techniques; and FIGS. 13A and 13B illustrate the basic structure of packet formats that may be used by the RPU and headset.

DETAILED DESCRIPTION OF THE PREFERRED EMBODIMENTS

The present invention will be described in the context of an RF wireless personal communications system. The invention is equally applicable to wireless communications systems of various description, including infrared, ultrasonic, etc.

Referring now to FIG. 1, a personal communications system in which the present invention may be used includes a Remote Processor Unit (RPU) 110 and a headset 120 that achieve bidirectional communication through an RF or other wireless link. The term "headset" is used herein to denote a single earpiece, two earpieces, headphones, etc. If one or more earpieces are used, the earpiece or earpieces may be of any of various types, including BTE (Behind The Ear), ITE (In The Ear), etc. In a preferred embodiment, the bidirectional communications link is substantially similar to that disclosed in the full-featured embodiment of WO 96-41498.

The RPU 110 includes a main processing unit 101 and one or more antennas (102a–102e) for transmitting and receiving information to and from the headset. In the case of the illustrated RF system, the RPU preferably includes multiple antennas for diversity transmission, diversity reception, or both. The RPU may also include an external interface 103 for receiving information from an external source.

The headset 120 includes a main processing unit 105, an antenna 107, a microphone 104 and a speaker or display 106.

Referring to FIG. 2, the RPU 110 is microcontroller based. Input and output of information to and from the microcontroller 201 is accomplished through a digital interface unit 202. The digital interface unit 202 is coupled in turn to an I/O section 210 and an RF section 220.

The microcontroller 201 supports at least two key operational functions: nanocell master protocol management and RPU management. Nanocell master protocol management includes such tasks as constantly monitoring signal conditions to select the correct antenna for the next set of packets and selecting the correct timeslot(s) for the RPU and headset to operate in RPU management includes such tasks as monitoring RPU battery conditions, monitoring RPU state, performing RPU setup functions, and accepting headset setup functions to be sent to the headset.

The digital interface unit 202 connects the microcontroller 201 to all other subsystems within the RPU. It performs real-time data protocol management including such tasks as: a) Accepting a steady state digital input stream and providing it as packets to the RF transmitter as required; b) Accepting received RF packets and performing any ECC functions to provide a steady digital output stream; c) Providing a means to use the RF link for control functions; and d) Providing any external timing required to support the D/A and A/D operations.

The I/O section 210 provides for both analog and digital input and output. Digital I/O is performed by an external digital interface 209. An analog input signal 213 is digitized using an A/D converter 212 and input to the digital interface unit. An analog output signal 211 is produced by a D/A converter 210 in response to data from the digital interface unit 202.

The RF section 220 includes both a transmitter 203 and a receiver 208 and optionally provides for transmit and receive diversity. The transmitter accepts a digital modulation data stream and control signals and provides an RF output to a specific antenna or antennae to provide the strongest signal to the headset. The receiver accepts control signals used to select the correct antenna and provides a digital data stream that is the output from the RF receiver. The transmitter is therefore coupled to a transmit antenna selector 204, which selects from among multiple transmit antennae (205a–205e) for transmitting information to the headset. The receiver 208 is coupled to a receive antenna selector 207, which selects from among multiple receive antennae (206a–206e) for receiving information from the headset.

System timing is controlled by a counter or master timer (not shown) which is used to control critical timing issues. This counter operates at four times the data bit rate. Each data bit time is divided into four clock times with the potential of choosing one of eight clock phases (four non-inverted and four inverted phases).

More particularly, in an RF communications system in the ISM band, because of the very small wavelength of the system, very slight changes in position can result in a 180° phase shift of the received signal. A sync pulse beginning each transmission is used to determine the appropriate phase. In one embodiment, a sync pulse is indicated by a first transition followed three data bit times later by an opposite transition. The direction of the transition determines the appropriate clock phase to be used for the remainder of the transmission.

Accessible to the microprocessor 201 are various registers used in performing bandwidth management in a manner described hereafter. In an exemplary embodiment the registers are located within the digital interface 202 and are accessed by the microprocessor through interface registers shown in FIG. 3A using a well-known mechanism. Referring to FIG. 3B, Primary Status Registers include a Phase Position Register, a Sync Count/Status Register, a Header Count/Status Register, a Header ECC Count/Status Register, a Data Count/Status Register and a Data ECC Count/Status Register. These primary registers are used to "capture" information for subsequent storage in the individual Timeslot registers of FIG. 3D–3I. More particularly, at the beginning of each timeslot, the contents of registers used to store information for that timeslot are loaded into the Primary Status Registers. During the timeslot, the contents may be altered according to events occurring during the timeslot. At the end of the timeslot, the contents of the Primary Status Registers may or may not be saved.

The following paragraphs describe in detail the function of the various registers.

Phase Position

Address: 0,1

This register is a temporary holding register which records the phase position as compared to the unit's current clock phase.

Sync Count/Status

Address 2,3

The first eight bit register contains the count of the number of good sync pulses received. The count is incremented for each good one and is decremented for each bad one. This counter is used to indicate how stable sync pulse reception has been. If the counter is greater than zero, then although the unit may not currently be receiving sync pulses, it has received enough sync pulses to assume that the unit may still be in sync. If the count=0 a lost sync condition is declared. The unit must then focus on finding a sync pulse. The second eight bit register is a shift register which indicates in which of the last eight frames a good sync pulse has been received. A 1 indicates a good sync pulse, 0 indicates a bad sync pulse. This register shows the state of the sync flag for the last eight frames allowing the system to view in real-time the quality of the signal and to perform corrective actions to improve the signal quality if required.

Header Count/Status

Address: 4,5

The first eight bit register contains the count of the number of good header frames received. The count for each good one is incremented, decremented for a bad one. This counter is used to indicate how stable header data reception has been. If the counter is greater than zero then several good header data sections have been received in the past. If the count=0 a lost header condition is declared. The second eight bit register is a shift register which indicates in which of the last eight frames a good header byte has been received. A 1 indicates a good header, 0 indicates bad header data.

Header ECC Count/Status

Address: 6,7

The first eight bit register contains the count of the number of totally error free headers received. The count is incremented for each good one, decremented for a bad one. This counter is used to indicate how much error correction is occurring on an ongoing basis. If the counter is greater than zero then the EC subsystem is being required to do data recovery work. If the count=0 then the ECC subsystem is reporting no bit errors in the received data (a very good sign). The second eight bit register is a shift register which indicates in which of the last eight frames a perfect header has been received. A 0 indicates ECC was required, 1 indicates the header was error free.

Data Count/Status

Address: 8,9

The first eight bit register contains the count of the number of good data frames received. The count is incremented for each good one, decremented for a bad one. This counter is used to indicate how stable the data reception has been. If the counter is greater than zero then several good data sections have been received in the past. If the count=0 a lost data condition is declared. The second eight bit register is a shift register which indicates in which of last eight frames good header byte data has been received. A 1 indicates good data, 0 indicates bad data.

Data ECC Count/Status

Address: 10,11

The first eight bit register contains the count of the number of totally error free data packets received. The count is incremented for each good one, decremented for a bad one. This counter is used to indicate how much error correction is occurring on an ongoing basis. If the counter is greater than zero then the EC subsystem is being required to do data recovery work. If the count=0 then the ECC subsystem is reporting no bit errors in the received data (a very good sign). The second eight bit register is a shift register which indicates in which of the last eight frames sync pulse a perfect data packet has been received. A 0 indicates ECC was required, 1 indicates the data was error free before any ECC processing.

Internal Command/Status A

Address: 12, 13

These registers are the command and status register group A.

Internal Command/Status B

Address 14, 15

These registers are the command and status register group B.

Referring to FIG. 3C, data transfer registers are provided for transmitting and receiving data pockets. In an exemplary embodiment, data packets are allowed to have a maximum length of 32 words.

Referring to FIG. 3D, Phase Position Registers are provided for each timeslot. Although in a preferred embodiment ten timeslots are used, Phase Position Registers are provided for 16 times slots, Timeslot 0 through Timeslot 15, allowing for future expansion. The Phase Position Registers are used to maintain sync between multiple units which each maintain their own local control. Clock drift between the multiple units is inevitable. These registers allow each unit to track the relative time alignment of the other units operating within the same space.

Referring to FIG. 3E, Sync Status Registers are provided for each timeslot. In the illustrated embodiment, the high byte of each register stores a Sync Count, and the low byte of each register stores Status information for the last eight frames. As previously described, the Sync Count for a particular timeslot is incremented for each frame that "good sync" was received for that timeslot. A sync pulse is a distinctive pattern disallowed in accordance with the data encoding that is employed (for example Manchester encoding). During sync acquisition, devices look for sync pulses continuously. After sync has been acquired, a device looks for a sync pulse within a specified sync window. The Sync Count is decremented for each frame that bad sync (the lack of good sync) occurs. The Status Registers store synchronization status for each timeslot for the last eight frames. For example, a value of 11111110 would indicate that bad sync occurred in the most recent frame but that good sync was received in the preceding seven frames. If in the next frame good sync was again received, the value would be updated to 11111101.

The Header Status Registers, Header ECC Status Registers, Data Status Registers and ECC Status Registers of FIG. 3F through FIG. 3I, respectively, are used in a similar manner as the Sync Status Registers of FIG. 3B. For each frame that a good header or data packet is received for a particular timeslot, the corresponding count is incremented. When the header or data packet is bad, the count is decremented. The status portion of the registers gives a history of the most recent eight frames, whether a good header or data packet was received or the header or data packet was bad.

A data packet may be bad but correctable using ECC. The use of ECC should be minimized, however, to conserve power. Referring to FIG. 3I, each time ECC checking reveals a perfect data packet, the ECC Count is incremented. Each time that error correction must be attempted, the ECC Count is decremented. The status portion of the registers gives a history of the most recent eight frames, whether error correction had to be attempted or not.

Referring to FIG. 3J, registers are also provided for storing by timeslot the serial numbers of other RPUs within range of the present RPU. In the illustrated embodiment, the serial numbers are four bytes long. For each timeslot, a further register 301J is provided in which a "vision count" is stored of the number of RPUs within range of each of the RPUs that are within range of the present RPU. During Serial Number Exchange, described in greater detail below, each RPU broadcasts how many RPUs are within range of it (i.e., how many entries it has within the Serial Number registers of FIG. 3J). Each RPU stores this information in the respective count registers of FIG. 3J for use during Slot Negotiation, described hereinafter. Serial Number Exchange is executed periodically by each RPU.

The information stored in the registers of FIGS. 3A–3J in essence represents a snapshot of the current communications environment as seen by a particular RPU. The snapshot is updated at the frame rate, 2000 times per second in a preferred embodiment. This real-time information allows for intelligent cooperative interaction of the different RPUs to achieve distributed, collective bandwidth management in an efficient manner.

Referring to FIG. 3K, in addition to the foregoing registers there are provided Control and Status Registers. The registers are used to store status and control information for up to two earpieces (Earpiece A and Earpiece B). Information is stored concerning sample size and sample rate in the uplink and downlink directions. The parameters may be varied through Bandwidth Negotiation described in greater detail below. Finally the serial numbers of the RPU and the serial number of its matching earpieces (each eight-byte quantities) are stored.

Referring to FIG. 4, the headset will be described. The headset is microcontroller-based. Input and output of information to and from the microcontroller 401 is accomplished through a digital interface unit 402. The digital interface unit 402 is coupled in turn to an I/O section 410 and an RF section 420.

The I/O section 410 provides for both analog and digital input and output. Digital I/O is performed by an external digital interface 405. An analog input signal (mic input) is produced by a microphone 409 that picks up ambient sounds. The mic input is digitized using an A/D converter 408 and input to the digital interface unit 402. An analog output signal (audio out) is produced by a D/A converter 406 in response to data from the digital interface unit 402. The audio out signal is applied to a speaker 407. Of course, a video output signal may be used in lieu of or in addition to an audio output signal.

The RF section 420 includes an RF transceiver 403 and an antenna 404. Although diversity techniques may be used where applicable, the size and power constraints typical of the headset discourages the use of diversity.

Accessible to the microcontroller are various registers used in performing bandwidth management in a manner described hereafter. In a preferred embodiment, these registers are substantially the same as or identical to the registers of the RPU shown in FIGS. 3A–3K.

In some instances, the headset may receive communications from other devices that are not received by that headset's RPU. As described hereinafter, it is important that the RPU be made aware of such devices. Accordingly, the RPU periodically requests the headset to transfer to the RPU the contents of the registers of FIG. 3J stored within the headset.

In a preferred embodiment of the system of FIG. 1, the bidirectional wireless link has a bandwidth approaching or exceeding 5 Mbps. The number of personal communications systems that may be accommodated within a single "nano-cell" depends on what type or types of personal communications systems are present. A single multimedia system will consume essentially the entire bandwidth. The same bandwidth will allow numerous "toll quality" (telephone quality) systems to be supported. An intermediate number of hearing health care systems may be supported.

More particularly, in a preferred embodiment, the present bandwidth management techniques are based on a frame rate of 2000 frames per second, each frame containing 2832 clock periods. A single multimedia system requires substantially an entire frame of information for full-quality sound. A hearing health care system requires approximately one fifth of the frame capacity. A telecommunications system requires approximately one tenth of the frame capacity. Using a telecommunications system as a common denominator, the frame may then be divided into 10 timeslots. Each telecommunications system requires a single timeslot, allowing for 10 simultaneous telecommunications users ("ten-person hug") within the same RF space. Each hearing health care user requires two timeslots, allowing for five simultaneous hearing health care users within the same RF space. Each multimedia user requires 10 timeslots for stereo, CD-quality sound, allowing for only one multimedia user within the same RF space.

In one aspect of the present invention, protocols are used to achieve an appropriate timeslot allocation for all of the users in an RF space. In another aspect of the invention, when timeslot allocation alone is insufficient to full accommodate all users, bandwidth allocation is further used to ensure, insofar as possible an acceptable compromise for all users.

More particularly, in a preferred embodiment, various grades of service are defined for the various types of systems. No grade of service is lower than toll quality. Three higher grades of service are provided for, including hearing health care, medium-fidelity multi-media and high-fidelity multi-media. Additional grades of service may also be provided. The data packet formats for the respective data transfer modes may be as follows:

Toll Quality

(Data Transfer Mode 0)

Data Rate
  EAR TO RPU 8 BIT SAMPLES 8,000 SAMPLES/SECOND
  RPU TO EAR 8 BIT SAMPLES 8,000 SAMPLES/SECOND
Basic Structure
  GUARD BAND
  6 BITS
  RPU TO EAR SYNC PULSE
  3 BITS HIGH
  1 BIT LOW
  RPU TO EAR HEADER (MANCHESTER ENCODED, TOTAL 24 BITS)
    8 BITS OF DATA
    4 BITS OF ECC
  RPU TO EAR(A) DATA (MANCHESTER ENCODED, TOTAL 120 BITS)
    40 BITS OF DATA
    20 BITS OF DATA
  EAR(A) TO RPU SYNC PULSE
  3 BITS HIGH
  1 BIT LOW
  EAR(A) TO RPU HEADER (MANCHESTER ENCODED, TOTAL 32 BITS)
    8 BITS OF DATA
    8 BITS OF ECC
  EAR(A) TO RPU DATA (MANCHESTER ENCODED, TOTAL 160 BITS)
    40 BITS OF DATA
    40 BITS OF ECC
  GUARD BAND
  6 BITS

Hearing Health Care

(Data Transfer Mode 1)

Data Rate
  EAR TO RPU 16 BIT SAMPLES 16,000 SAMPLES/SECOND
  RPU TO EAR 14 BIT SAMPLES 16,000 SAMPLES/SECOND
Basic Structure
  GUARD BAND
  6 BITS
  RPU TO EAR SYNC PULSE
  3 BITS HIGH
  1 BIT LOW
  RPU TO EAR HEADER (MANCHESTER ENCODED, TOTAL 24 BITS)
    8 BITS OF DATA
    4 BITS OF ECC
  RPU TO EAR(A) DATA (MANCHESTER ENCODED, TOTAL 432 BITS)
    144 BITS OF DATA
    72 BITS OF ECC
  EAR(A) TO RPU SYNC PULSE
  3 BITS HIGH
  1 BIT LOW
  EAR(A) TO RPU HEADER (MANCHESTER ENCODED, TOTAL 32 BITS)
    8 BITS OF DATA
    8 BITS OF ECC
  EAR(A) TO RPU DATA (MANCHESTER ENCODED, TOTAL 504 BITS)
    126 BITS OF DATA
    126 BITS OF ECC
  GUARD BAND
  6 BITS

Medium-Fidelity Multimedia

(Data Transfer Mode 2)

Data Rate
  EAR(A) TO RPU 8 BIT SAMPLES 8,000 SAMPLES/SECOND
  RPU TO EAR(A) 16 BIT SAMPLES 32,000 SAMPLES/SECOND
  RPU TO EAR(B) 16 BIT SAMPLES 32,000 SAMPLES/SECOND
Basic Structure
  GUARD BAND
  6 BITS
  RPU TO EAR SYNC PULSE
  3 BITS HIGH
  1 BIT LOW
  RPU TO EAR HEADER (MANCHESTER ENCODED, TOTAL 24 BITS)
    8 BITS OF DATA
    4 BITS OF ECC
  RPU TO EAR(A) DATA (MANCHESTER ENCODED, TOTAL 816 BITS)
    272 BITS OF DATA
    136 BITS OF ECC
  RPU TO EAR(B) DATA (MANCHESTER ENCODED, TOTAL 816 BITS)
    272 BITS OF DATA
    136 BITS OF ECC
  EAR(A) TO RPU SYNC PULSE
  3 BITS HIGH
  1 BIT LOW
  EAR(A) TO RPU HEADER (MANCHESTER ENCODED, TOTAL 32 BITS)
    8 BITS OF DATA
    8 BITS OF ECC
  EAR(A) TO RPU DATA (MANCHESTER ENCODED, TOTAL 160 BITS)
    40 BITS OF DATA
    40 BITS OF ECC
  GUARD BAND
  6 BITS

High-Fidelity Multimedia

(Data Transfer Mode 3)

Data Rate
  EAR(A) TO RPU 8 BIT SAMPLES 8,000 SAMPLES/SECOND
  EAR(B) TO RPU 8 BIT SAMPLES 8,000 SAMPLES/SECOND
  RPU TO EAR(A) 16 BIT SAMPLES 48,000 SAMPLES/SECOND
  RPU TO EAR(B) 16 BIT SAMPLES 48,000 SAMPLES/SECOND Basic Structure
  GUARD BAND
    6 BITS
  RPU TO EAR SYNC PULSE
    3 BITS HIGH
    1 BIT LOW
  RPU TO EAR HEADER (MANCHESTER ENCODED, TOTAL 24 BITS)
    8 BITS OF DATA
    4 BITS OF ECC
  RPU TO EAR(A) DATA (MANCHESTER ENCODED, TOTAL 1200 BITS)
    400 BITS OF DATA
    200 BITS OF ECC
  RPU TO EAR(B) DATA (MANCHESTER ENCODED, TOTAL 1200 BITS)
    400 BITS OF DATA
    200 BITS OF ECC
  EAR(A) TO RPU SYNC PULSE
    3 BITS HIGH
    1 BIT LOW
  EAR(A) TO RPU HEADER (MANCHESTER ENCODED, TOTAL 32 BITS)
    8 BITS OF DATA
    8 BITS OF ECC
  EAR(A) TO RPU (MANCHESTER ENCODED, TOTAL 160 BITS)
    40 BITS OF DATA
    40 BITS OF ECC
  EAR(B) TO RPU SYNC PULSE
    3 BITS HIGH
    1 BIT LOW
  EAR(B) TO RPU HEADER (MANCHESTER ENCODED, TOTAL 32 BITS)
    8 BITS OF DATA
    8 BITS OF ECC
  EAR(B) TO RPU DATA (MANCHESTER ENCODED, TOTAL 160 BITS)
    40 BITS OF DATA
    40 BITS OF ECC
  GUARD BAND
    6 BITS FIGS. 5 through FIG. 11 illustrate various communications scenarios to which the bandwidth management techniques of the present invention may be applied. Referring to FIG. 5, the communications space of interest contains a single RPU is communicating with a single earpiece. No other devices are present in the RF space. Hence, there is no nanocell interference in the usual sense. The RF environment may nevertheless be rapidly changing. The earpiece may be moving with movement of the user's head. The RPU may also be moving, for example being swung in a purse. The communications path may further be affected by jewelry, the user's arms and hands, etc. Bandwidth management includes providing a way to maintain the quality of communications in the presence of such variations. In an RF system, for example, any of several different measures may be applied, including diversity and/or power control. In a quadrature system, IQ node selection may also be employed. FIG. 6 illustrates a similar case as FIG. 5, but with two earpieces instead of one.

In FIGS. 7–11, multiple systems are present in the RF space. For simplicity, only two systems are illustrated. Both headsets are assumed to be within range of transmissions from both RPUs. Similarly, both RPUs are assumed to be within range of backscatter transmissions from both headsets. The RPUs may be able to communicate directly, or may be limited to communicating only indirectly via backscatter from one or both of the earpieces.

In FIG. 7, both of the personal communications systems are assumed to be telecommunications systems. Both systems may therefore be accommodated using timeslot allocation techniques, if necessary. In FIG. 8, both systems are assumed to be hearing health care systems. Once again, both systems may be accommodated using only timeslot allocation. In FIG. 9, both systems are assumed to be multimedia systems. Bandwidth limitations require that both timeslot allocation and bandwidth negotiation be performed in order to accommodate both systems. In the case of two multimedia systems, bandwidth is sufficient to provide medium-grade service to both systems.

In FIG. 10, one system is a telecommunications systems and one system is a hearing health care system. Timeslot allocation is sufficient to accommodate both systems.

In FIG. 11, one system is a multimedia system and one system is of another type, either telecommunications or hearing health care. Both timeslot allocation and bandwidth negotiation is required in order to accommodate both systems. If no other systems are present, then bandwidth is sufficient to provide high-medium-grade service to the multimedia system and normal service to the hearing health care system.

Having described the general operation and effect of the present bandwidth management techniques, examples of particular techniques that may be employed for timeslot allocation and bandwidth negotiation will now be described.

In a preferred embodiment, the RPU is the master timing point for the nanocell protocol. The key functions of the nanocell protocol may be described as follows: If two or more RPUs come within operation range of each other, then each RPU will maintain its own master clock, and in addition, will maintain one or more skew registers which define the timeslot(s) in use by itself and neighboring RPUs. The headset is slaved to the RPU. Each packet from the RPU causes the headset to evaluate the current timing to determine if a re-sync operation should occur. If a headset is within range of two or more RPUs, then the headset will maintain sync with the RPU that has the matching serial numbers.

A state engine composed of a primary state machine and a secondary state machine is used in the RPU and in the headset for bandwidth management in accordance with a preferred embodiment of the present invention. Each of the primary nanocell protocol states will be described.

Power on Reset: In this state, the system performs all initial clearing, resetting, and other functions required to power up the system. At the conclusion of these operations, the system enters the System Reset State.

System Reset: In this state the system clears key registers and counters which enable the system to begin normal operations. This state may be entered from any state, entry to this state is controlled by two potential sources: First is the power on startup of the system, Second the micro-controller is able to force the system to do a reset in an attempt to recover from what would otherwise be an un-recoverable error.

Sync Acquisition: In this state the RPU will send serial number identification packets to the earpiece attempting to hear a sync pulse and return packet from the earpiece. In this state the EAR will listen for a sync pulse and serial number packet from its' own RPU.

Sync Acquired: Once a Sync pulse has been acquired, we enter the state of sync acquired, and process the remainder of the packet to determine what type of packet it is. Once the RPU and EAR are in sync, the data exchange state is entered.

Data Exchange: The normal operational state for the system is the data exchange state. While in this state the RPU and EAR are able to exchange information, and RPU's are able to exchange data between each other. Within the primary Data Exchange state, the unit may transition between various secondary states. These secondary states in particular realize various features of the bandwidth management techniques of the present invention. Prior to describing the secondary states in detail, various aspects of the present bandwidth management techniques will be more generally described.

Fundamentally, the bandwidth management techniques of the present invention are based on Time Division Multiple Access (TDMA). TDMA techniques have found widespread use in cellular telephone systems. However, the communications environment described herein exhibits several important differences from the well-known cellular environment. In particular, in the present communications environment, there are no devices of fixed location (like the base stations of a cellular system.) Rather, all devices are mobile, with the mobile devices communicating in RPU/headset pairs. (In the case of a binaural headset, a single RPU communicates with two transceivers independently.) All of the RPUs are peers. Furthermore, RPUs may be of different types (telecom, hearing health care, multimedia, etc.). Accordingly, well-known TDMA techniques by themselves do not suffice to achieve robust communications in such an environment.

Hence, beyond conventional TDMA techniques, several classes of dynamic bandwidth management techniques are provided that together allow robust communications in the present communications environment. These include Jumping, Slot Negotiation, and Bandwidth Negotiation.

In the present communications environment, when interference is first encountered, intelligent (not free-for-all) jumping is employed in a first attempt to reduce interference. The RPU/headset pairs are programmed to, upon the occurrence of a predetermined interference event, Jump together to a new timeslot. (Time alignment may also be applied during the Jump, as described more particularly below in relation to Slot Negotiation.) The interference event may be defined in various ways in accordance with quantitative and/or qualitative measures of communications quality. Increasing need for error correction, increasing incidence of bad sync, bad header or bad data, etc., indicate deterioration in communications quality. If the interference persists despite ameliorative measures (e.g., diversity control, power control), the RPU and headset jump. The amount of the Jump is based in part on the information stored in the databases of the RPU and headset, and is based in part on pseudo-random information, such as serial numbers, battery level, etc.

When the RPU and headset "land," the RPU begins transmitting serial number information in the prearranged timeslot, and the headset listens for transmissions by its RPU. The RPU and headset may Jump up to some predetermined number of times in an attempt to avoid interference. If the RPU and the headset are able to communicate successfully, then they resume normal operation. If not, then they proceed with Slot Negotiation.

During Slot Negotiation, the RPU and headset temporarily discontinue attempts to communicate with one another and instead "listen" for synchronization signals in an attempt to characterize the present communications environment. The first synchronization signal detected is arbitrarily designated as the beginning of Timeslot 0. All communications devices are required to periodically enter a Serial Number Exchange state in which a communications device broadcasts its serial number for other devices to hear. The RPU and headset listen for some number of frames (e.g., 32), sufficient to update their databases and ensure that all communications devices will have participated in Serial Number exchange. At the conclusion of this interval, the databases of the RPU and the headset, including the registers 301J containing device counts for each of the devices within range of the RPU and headset, will have been updated.

In general, the RPU then performs timebase alignment with respect to the device having the highest device count (or, if two or more devices "tie" for the highest device count, the device having the highest device count and the lowest timeslot). Of the devices that it can "see," the RPU, in effect, aligns its timebase with that of the device having the most comprehensive "view" of the communications environment. This arrangement recognizes—in analogous terms— that a person standing in an intersection is in a better position to direct traffic than a person working inside a manhole.

Referring to FIG. 13, if the communications environment is represented as a graph in which RPUs and headsets are represented as nodes and nodes that are within sufficiently close range of one another to allow for communications are joined by edges, then a nanocell system may be regarded as the transitive closure of a subgraph of such a graph. Within such a nanocell system, various points of synchronization may be defined. Some devices (e.g., Nodes 5, 6, 8 and 10) will be aligned to the device having the highest device count and (relative to any other devices having the same device count) the lowest timeslot of the entire nanocell system. Other devices will be aligned to devices that locally have the highest device count and the lowest timeslot, but do not have the highest device count of the entire nanocell system. In the example of FIG. 12, Nodes 1, 4 and 7 are aligned to Node 3, and Node 2 is aligned to Node 6.

Once the RPU has aligned its timebase according to the foregoing arrangement, if there are one or more empty timeslots, the RPU may attempt to claim them by broadcasting serial number information in the timeslots. If the timeslots are clear and the headset receives the serial number information, it broadcasts the same information back to the RPU (in reverse order). Communications between the RPU and the headset may then proceed. If the RPU does not receive the correct serial number information back from the headset, then a collision may have occurred with one or more other devices. The RPU then backs off for a pseudorandom time and makes a further attempt.

If no timeslots are available, then in one embodiment, the RPU waits until one or more timeslots become available. A command may be sent to the headset to cause it to produce a synthesized voice message to the effect that service is temporarily unavailable. Similarly, during interference conditions, if an RPU/headset pair would normally jump but there is no free slot to jump to, the pair will continue to communicate as best as possible without jumping. If communications are lost, the headset may of its own accord generate a synthesized voice message.

As described previously, the present system is designed to accommodate different types of devices having different bandwidth needs. In the case of telecom, hearing health care and multimedia devices, for example, a hearing health care device normally requires twice the bandwidth of a telecom device, and a multimedia device normally requires ten times the bandwidth of a telecom device. For efficient use of bandwidth, it is preferable that the timeslots used by a single device be contiguous. In this manner, data packets may be allowed to span timeslots, increasing the Maximum Transport Unit (MTU) of the system and increasing efficiency.

The number of timeslots required by a device wishing to transmit may not be available, or if they are available, they may not be contiguous. An important feature of the present invention is to allow for reduced-rate operation of a device, possibly together with simultaneous negotiation with other devices in an attempt to consolidate slots for full-rate operation. The following examples will serve to illustrate bandwidth negotiation features of the present bandwidth management techniques.

Assume, for example, that a hearing health care device which requires two timeslots for full-rate operation, is turned on in a communications environment in which only a single timeslot is available. The RPU will use the available timeslot to engage in a bandwidth negotiation with its headset in which the RPU and the headset will agree to reduced-rate operation. Assume now that a further timeslot becomes available but that it is not contiguous with the timeslot already occupied by the hearing health care device. Assume further that a telecom device is operating in an adjacent timeslot. The telecom device requires only a single timeslot and hence can occupy any one timeslot without penalty. The RPU of the hearing health care will then use the newly-available timeslot to perform a bandwidth negotiation with the telecom device, offering to exchange the slot in which the bandwidth negotiation is taking place for the current timeslot of the telecom device. The telecom device, because it suffers no penalty, is required to agree to the exchange. The hearing health care device then performs a further bandwidth negotiation with its headset to use the consolidated, contiguous timeslots for full-rate operation.

The bandwidth negotiation feature also allows system performance to degrade gracefully in high-traffic conditions. For example, a device might currently be using four contiguous timeslots when an interference event occurs. The RPU and headset will then Jump, multiple times if necessary, in an attempt to avoid the interference. If Jumping is not successful, then the RPU and headset will enter the Slot Negotiation procedure. As a result of the Slot Negotiation procedure, it may become apparent that only one timeslot is now available. The RPU may then enter into a Bandwidth Negotiation procedure with the headset to fall back to operating within a single timeslot, the timeslot that has been ascertained during Slot Negotiation to be clear.

If additional timeslots become available, the device will compete for the additional timeslots and, if it obtains them, will resume operation at full rate.

With the foregoing background and understanding, various further details of an exemplary embodiment of the present invention will be described.

The RPU and the headset have two principal operational modes, Transmit Mode and Receive Mode, and two power conservation modes, Wait and Sleep. In Transmit Mode, the RPU or headset is transmitting data. In the Receive Mode, the RPU or headset is receiving data. In Wait Mode, the RPU or headset is in a partial powerdown mode which is still able to receive data. In Sleep Mode, the RPU or headset is asleep and will only awaken if a trigger event occurs. Possible trigger events include expiration of a wakeup timer, occurrence of an incoming call, initiation of an outbound call, or other external event which requires reactivation of the link.

A detailed pseudo-code description of events during the Transmit and Receive Modes and the various primary states, as well as state transition details, is included as Appendix A.

Various packet types are defined for transferring various types of information between the RPU and headset. Referring to FIG. 13A, the type of packet is encoded within the packet header. In the illustrated embodiment, one nibble of header information is used to define the packet type. Another nibble of header information is used for packet-dependent information. Referring to FIG. 13B, eight types of packets are presently defined: Idle, Control Parameters, Status Request/Reply, Serial Number, Slot Negotiation, Bandwidth Negotiation, Sync Loss, and Data Transfer.

The basic structure of the data packets is as follows:

| RPU TO EAR STRUCTURE | | |
|---|---|---|
| A. | Guard Band = | 6 bits |
| | | Alternating 0, 1 pattern |
| B. | Sync Region = | 4 bits |
| | | 3 bit times high 1 bit time low. |
| | | Used to identify sync as well as polarity |
| C. | Header Region = | 24 bits (12 bits manchester encoded) |
| | | 8 bits of header data |
| | | 4 bits of ECC data |
| D. | Data Region(s) = | 120 bits (60 bits manchester encoded) |
| | | 40 bits of data |
| | | 20 bits of ECC data |
| EAR(A) TO RPU STRUCTURE | | |
| A. | Sync Region = | 4 bits |
| | | 3 bit times high 1 bit time low. |
| | | Used to identify sync as well as polarity |
| B. | Header Region = | 24 bits (12 bits manchester encoded) |
| | | 8 bits of header data |
| | | 4 bits of ECC data |
| C. | Data Region = | 160 bits (80 bits manchester encoded) |
| | | 40 bits of data |
| | | 40 bits of ECC data |

If a second earpiece, Ear(B), is present, the foregoing structure is repeated, followed by a guardband. Otherwise, the guardband follows the foregoing structure directly.

Normally, an RPU or headset will spend most of its time in the Data Exchange state described previously. Within the Data Exchange state, the RPU or headset may transition between various secondary states as follows.

1. Audio Data Transfer

While in this state, the RPU and EARPIECE are exchanging audio data and key status information. A Data Transfer Packet is used to transfer data between the RPU and the headset.

If all is well, the following events will occur:

A) As long as there continue to be good sync and data exchanges occurring, every 32 frames, the serial number state is entered to check that we are still talking to the correct earpiece, and to allow the world to see our serial number, vision counter, and status byte.

B) If the RPU hears a Broadcast RPU device, the RPU will signal the earpiece to still maintain our current time slot for control and sync, but to listen to a specific alternate timeslot for audio data.

If while in the alternate time slot mode, if there is a failure, the earpiece will revert back to the primary timeslot for audio data transfer.

C) If the system is a telecom device, and not a hearing health care device, if the RPU detects the end of call, the system will enter the Idle state.

D) If the RPU control input, or the touch panel are altered in a manner which requires a change in control settings within the earpiece, the RPU will change to the control parameters state to alter the required settings in the earpiece.

E) Every 20 min or so, the RPU will enter the Status state and retrieve key status information from the earpiece. The key status information includes:

1. Earpiece Battery level
2. Key system status items
3. Communications statistics F) If significant errors occur in the packets, the following events can occur:
  If it is a bad or missing sync pulse:
    If sync counter 0 then
      If the Jump counter<3 then add 1 to the jump counter. Set control time slot register to new time slot value based on the RPU control rule set. Enter the Sync acquisition mode to reacquire sync.
      If the Jump counter=3 then clear the Jump counter Enter the Passive Time Slot negotiation state
      If sync>0 then remain in the data transfer state and attempt to recover the header and data.
  If it is bad header data:
    If header counter=0 then
      If the Jump counter<3 then add 1 to the jump counter. Set control time slot register to new time slot value based on the RPU control rule set. Enter the Sync acquisition mode to reacquire sync.
      If the Jump counter=3 then clear the Jump counter. Enter the Passive Time Slot negotiation state.
    If header counter>0 then remain in the data transfer state and attempt to recover the data.
  If it is bad data:
    Supply interpolated data to the audio stream.
    If data counter=0 then
      If the Jump counter=3 then clear the Jump counter. Enter the passive Time Slot negotiation state.
    If data counter>0 then remain in the data transfer state and attempt to continue with next frame.

2. Serial Number Exchange

The Serial Number Packet is used to exchange serial numbers between the RPU and headset. This allows the units to ensure that a timeslot is only in use by an RPU and associated earpieces.

The actions in this state are as follows:
  A) The RPU sends its' serial number and the flag indicating which ear is to respond.
  B) The EAR will send the response which is its' serial number and current vision counter.
  C) Enter the state contained in the next state byte of the exchange packet. This feature allows the system to do the following:
    1) If the RPU has noted that our current bandwidth is too high for the available number of timeslots, we will enter the bandwidth negotiation state directly from the serial number exchange state to negotiate between the RPU and its EARPIECE a data transfer rate which is able to fit the current timeslot configuration.
    2) If the RPU has noted that more bandwidth is now available, we will enter the bandwidth negotiation state to increase the bandwidth utilization between the RPU and EAR.
    3) If all is well, the RPU enters the Status Request and Reply state to get the contents of the registers of FIG. 3J from the headset.

3. Control Parameters Exchange

A control Parameter Packet is used to exchange control information between the RPU and headset.

The actions in this state are as follows:
  A) The RPU sends the control data and the flag indicating which ear is to respond.
  B) The EAR will send the acknowledgement back to the RPU.
  C) Enter the data Transfer State.

4. Status Request and Reply

A Status Request/Reply Packet is used to request status information from he headset by the RPU.

The actions in this state are as follows:
  A) The RPU sends the request and the flag indicating which ear is to respond.
  B) The EAR will send the reply back to the RPU.
  C) Enter the Data Transfer state.

5. Passive Timeslot Negotiation

The actions in this state are as follows:
  If we entered this state as the startup of the data exchange state perform the following:
    A) Listen in each of the time slots for 100 frames.
    B) If there were no serial number frames exchanged during the 100 frames set the time slot register to 0 and enter the serial number exchange state.
    C) If there were serial numbers exchanged during the 100 frames, check the vision registers to determine who has the primary vision of the world (as far as we are concerned).
    D) Sync our system to the holder of the primary vision.
    E) Enter the serial number exchange state to lock our earpiece to the new sync structure.
  If we entered this state from the audio data transfer state performing the following:
    A) Listen in each of the time slots for 50 frames.
    B) If there were no serial number frames exchanged during the 50 frames set the time slot register to 0 and enter the serial number exchange state.
    C) If there were serial numbers exchanged during the 50 frames, check the vision registers to determine who has the primary vision of the world (as far as we are concerned).
    D) Sync our system to the holder of the primary vision.
      1) If the primary vision is self, the RPU will enter the active Timeslot negotiation state to share the fact that we believe we are now "BOSS".
    E) Enter the serial number exchange state to lock our earpiece to the new sync structure.

6. Active Timeslot Negotiation

A Slot Negotiation Packet is used by multiple RPU's and their earpieces to negotiate new time slot positions.

The actions in the state are:
  A) Broadcast our timeslot information and vision register.
  B) Listen in each of the time slots for 50 frames.
  C) If there were no serial number frames exchanged during the 50 frames set the time slot register to 9 and enter the serial number exchange state.
  D) If there were serial numbers exchanged during the 50 frames, check the vision registers to determine who has the primary vision of the world (as far as we are concerned).
  E) Sync our system to the holder of the primary vision.
    1) If the primary vision holder is self, the RPU will retain its' current timing data.
  F) Enter the serial number exchange state to lock our earpiece to the new sync structure.

7. Bandwidth Negotiation

A Bandwidth Negotiation Packet is used by the RPU and the earpiece to negotiate a new data transfer rate.

The actions in this state are as follows:
  A) The RPU will inform the EAR what data transfer mode will be employed.
  B) The RPU will inform the EAR what timeslot will be used for control.
  C) The RPU will inform the EAR what timeslot will be used for Audio data transfer.

D) Enter the Audio Data Transfer state to begin exchange of audio data.

8. Sync Loss Recovery

A Sync Loss Packet is used by the RPU and earpiece to signal continued loss of sync pulses even though the data position may be correct. (This forces a re-sync of the RPU and earpiece before they drift out of sync).

The actions in this state are the same as in the Audio Data Transfer state except that a "cautionary" header bit is set to alert listening devices that the subject RPU/headset pair may be drifting apart.

9. Idle:

An Idle Packet is used as a time filler and sync transport during system idle time.

The actions in this state are as follows:

A) 20 times per second the RPU will send an IDLE frame to the EAR. The EAR will reply with an IDLE frame. This mode allows the RPU and EAR to remain in sync while reducing the power level by at least 85%.

B) If a call is started by the user, or a call is received, we enter the audio data transfer state.

The foregoing states need not be exclusive. An important feature of the present invention is the ability to concurrently use one or more timeslots for audio data transfer and a further timeslot for control and/or negotiation. For example, an RPU that would normally require multiple timeslots for audio data may continue audio transmission in a single timeslot at lower quality when necessary, at the same time negotiating with other RPUs for one or more additional timeslots. A further important application of the capability is to accommodate broadcast devices. In a classroom, conference room, auditorium, etc., it may be desirable for a common transmitter to serve as the audio source for all headsets within range. When an RPU comes within range of such a device (as recognized by the device's serial number, for example) the RPU instructs the headset to listen to the broadcast device for audio information in one or more timeslots but to continue to listen to the RPU in another timeslot for control information. Upon occurrence of certain events, such as when the RPU and headset travel out of range of the broadcast device, the RPU may then immediately resume audio data exchange with the headset.

This feature is particularly advantageous in hearing health care applications. Inside a classroom, for example, a student's headset may listen to a broadcast transmitter that transmits an instructor's voice. Outside the classroom the headset may automatically revert to normal operation in which the headset transmits audio information to the RPU for processing and transmission back to the headset.

More generally, the bandwidth management techniques of the present invention may be practiced both where control information is communicated "out-of-band" with respect to real-time data and where control information is communicated in-band. An example of a communications system in which control information is communicated in-band is Ethernet. An example of a communication system in which control information is communicated out-of-band is ISDN, in which control information is communicated separately on the D-channel. The bandwidth management techniques of the present invention are applicable to both models of communication.

By using intelligent power management techniques, battery life for both the RPU and the earpiece may be significantly prolonged. One technique for achieving increased battery life is to minimize the use of error correction at the RPU and at the earpiece. Specifically, in RPU transmit mode, if the RPU-to-ear ECC history is bad (as determined from the exchange of status information), then the power level is increased one level if possible. (The power level may already be the maximum allowed level, in which case it cannot be increased.) If on the contrary the ECC history is good, then the power level may be decreased on a trial basis to see if less power may be sufficient.

Recall that RF power for the earpiece is supplied by the RPU in accordance with backscatter transmission by the earpiece. If the ear-to-RPU ECC history is bad, the RPU boosts power during the backscatter transmission period. If the ECC history is good, power may be decreased on a trial basis.

It will be appreciated by those of ordinary skill in the art that the present invention may be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of sharing a bandwidth resource among multiple autonomous communications systems each comprising a Remote Processing Unit/headset pair coupled by a wireless communications link, the method comprising the steps of:

transmitting real-time information from one device of a pair to the other device of the pair;

experiencing difficulty receiving the real-time information at the other device because of interference from another device pair; and if the interference continues, performing at least one of:
a jump procedure in which the pair of devices jump to a different portion of the shared bandwidth resource determined to be free;
a first negotiation procedure in which the Remote Processing Unit aligns its timebase to that of a selected other Remote Processing Unit; and
a second negotiation procedure in which the Remote Processing Unit and the headset agree to cease exchanging real-time information within one or more particular portions of the shared bandwidth resource.

2. The method of claim 1, wherein the wireless communications link is a slotted wireless communications link.

3. The method of claim 2, wherein said first negotiation procedure is a slot negotiation procedure.

4. The method of claim 3, wherein at least one device of the Remote Processing Unit and the headset of each device pair comprises a clock of a predetermined nominal frequency and a phase position counter, the method comprising said at least one of the Remote Processing Unit and the headset performing the steps of:

monitoring the bandwidth resource to detect occurrences of a distinctive synchronization signal; and when a synchronization signal is detected, storing, in correspondence to a timeslot in which the synchronization signal was detected, a phase position determined by the phase position counter.

5. The method of claim 4, comprising the further steps of said at least one of the Remote Processing Unit and the headset performing the steps of:

receiving identifying packets from multiple other devices, an identifying packet containing an identifier of a sending device together with a count of devices received by the sending device; and when an identifying packet is received, storing the count in correspondence to timeslot in which the identifying packet was received.

6. The method of claim 5, wherein said at least one device is the Remote Processing Unit, wherein said slot negotiation procedure comprises the Remote Processing Unit selecting another Remote Processing Unit to be aligned to based on a stored count of devices received by said another Remote Processing Unit.

7. The method of claim 6, wherein said slot negotiation procedure further comprises the Remote Processing Unit setting the phase position counter in accordance with a phase position of said another Remote Processing Unit stored in correspondence to said stored count.

8. The method of claim 3, where said slot negotiation procedure comprises the Remote Processing Unit communicating with and agreeing with another Remote Processing Unit to alter timeslot assignments.

9. The method of claim 8 comprising performing a slot negotiation procedure using one timeslot and concurrently exchanging audio information between the Remote Processing Unit and the headset using another timeslot.

10. The method of claim 3, comprising the steps of:

performing a jump procedure in which the pair of devices jump to a different timeslot determined to be empty; and transmitting information from one device of the pair to the other device of the pair.

11. The method of claim 10, comprising the further steps of:

failing to receive the information at the other device because of interference from another device pair; and in response to the interference, performing a slot negotiation procedure in which the Remote Processing Unit aligns its timebase to that of a selected other Remote Processing Unit.

12. The method of claim 11, wherein the steps of performing a jump procedure, transmitting information, and failing to receive the information are performed multiple times prior to performing the slot negotiation procedure.

13. The method of claim 3, comprising the steps of:

exchanging audio information between devices of a pair using variable-length data packets, wherein a data packet is allowed to span multiple timeslots; and exchanging other information between devices of a pair using fixed-length packets commensurate in length with the duration of a single timeslot.

14. The method of claim 13, comprising the steps of:

exchanging audio information between devices of a pair using multiple timeslots;

experiencing interference with the exchange of audio information;

performing a slot negotiation procedure; and following the slot negotiation procedure, performing a bandwidth negotiation procedure in which the Remote Processing Unit and the headset agree to exchange audio information using a reduced number of timeslots.

15. The method of claim 14, comprising the further step of subsequently performing a bandwidth negotiation in which the Remote Processing Unit and the headset agree to exchange audio information using an increased number of timeslots.

16. The method of claim 2, wherein said second negotiation procedure is a bandwidth negotiation procedure in which the Remote Processing Unit and the headset agree to cease exchanging real-time information within one or more particular timeslots.

17. The method of claim 1, wherein the wireless link is a bidirectional wireless link.

* * * * *